Feb. 14, 1933.   A. H. ADAMS   1,897,411
SPRING
Original Filed June 12, 1928   2 Sheets-Sheet 1
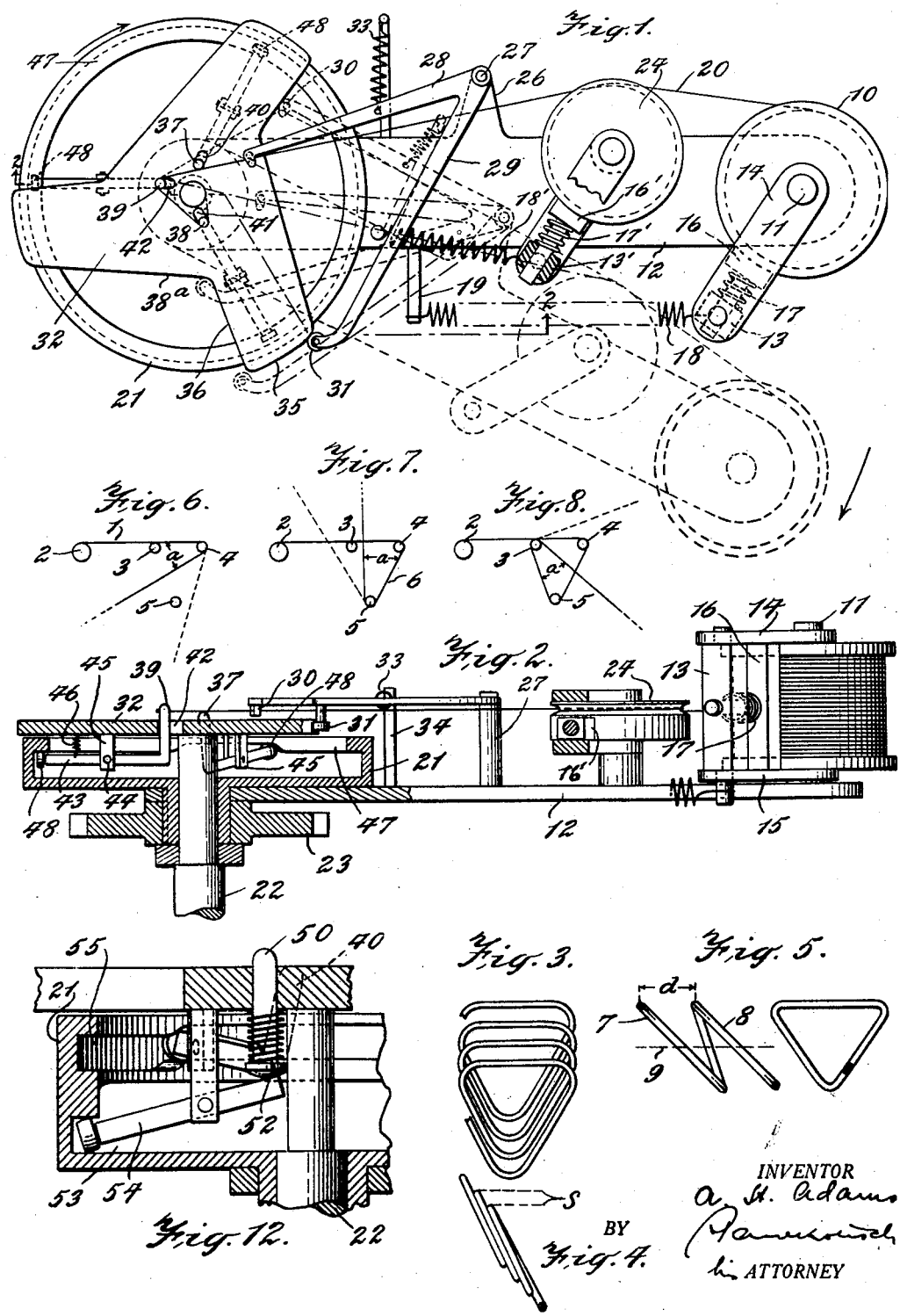

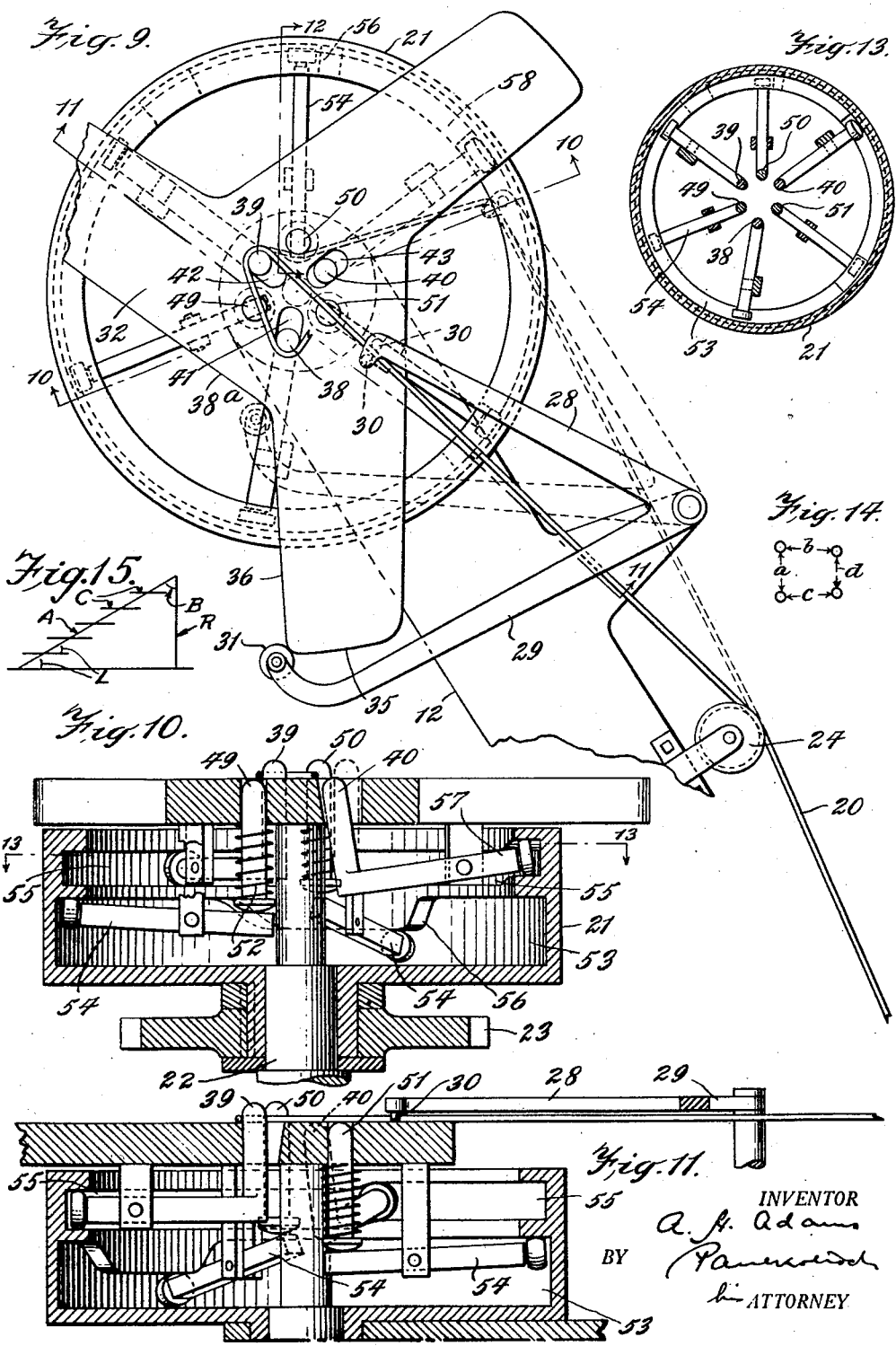

Patented Feb. 14, 1933

1,897,411

UNITED STATES PATENT OFFICE

ARTHUR H. ADAMS, OF LA GRANGE, ILLINOIS, ASSIGNOR TO TROY LAUNDRY MACHINERY COMPANY, INC., OF NEW YORK, N. Y., A CORPORATION OF DELAWARE

SPRING

Application filed June 12, 1928, Serial No. 284,722. Renewed July 2, 1932.

This invention relates to springs and in particular to convoluted springs skewed.

In certain classes of machines, for example, in laundry pressing and ironing machines and the like, it is desirable to provide a padded surface of comparatively high resiliency, relatively long life and which is substantially non-absorbent. It has been found that a convoluted spring having the turns permanently skewed at an angle to the spring axis provides a practical and economical basis for the construction of such a resilient surface.

Accordingly, it is an object of this invention to provide a method of winding a convoluted spring with the individual convolutions thereof inclined to the common axis of the convolutions.

Another object of the invention is to provide a method of winding a spring with the convolutions of any desired shape which, during the winding process, are simultaneously given a permanent set inclining them at an angle to the spring axis, the angle being the angle of the skew.

A feature of the invention resides in a machine for continuously winding and simultaneously giving a skewed set to a convoluted spring.

Another feature pertains to the method of manufacturing a skewed convoluted spring by giving definite angular sets at regularly recurring points throughout the length of a spring wire.

A still further feature is to provide means for continuously and economically winding a skewed convoluted spring of any desired cross-section with all the convolutions thereof inclined to the spring axis.

Finally, the invention contemplates as a new article of manufacture a convoluted spring which is resilient in an angular direction with respect to the spring axis. Further, my invention provides a spring which is skewed as the coils of the spring are formed.

Other features and advantages not enumerated will be apparent after the following detailed description and the appended claims have been considered.

While the specific apparatus is disclosed herein for manufacturing a skewed convoluted spring according to the invention, it will be understood that the invention is not limited to this particular apparatus, the broad aspect of the invention residing in the method of manufacturing a skewed convoluted spring.

Referring to the drawings, Fig. 1 shows a plan view of a portion of a machine for winding a skewed convoluted spring according to the invention.

Fig. 2 is a sectional view of the portion of machine shown in Fig. 1 taken along the line 2—2.

Figs. 3, 4 and 5 are views of a spring produced by the machine shown in Figs. 1 and 2; Figs. 3 and 4 showing the spring as it emerges from the machine, and Fig. 5 showing the spring stretched.

Figs. 6, 7 and 8 schematically represent successive steps to be followed in practising the fundamental method of winding a spring according to the invention.

Fig. 9 illustrates an alternative form of machine for winding skewed convoluted springs employing special means for giving the set to the spring convolutions.

Figs. 10 and 11 are sectional views of the machine shown in Fig. 9 taken along the lines, 10—10 and 11—11 respectively of Fig. 9.

Fig. 12 is a detail showing one of the winding pins depressed and a corresponding "back breaking" pin raised, and taken on line 12 of Figure 9.

Fig. 13 is a sectional view showing the relations between the pin-operating cams and taken along line 13—13 of Fig. 10.

Fig. 14 is a schematic diagram showing the manner of spacing the winding pins for the producton of a square skewed spring.

Figure 15 is a diagrammatic sketch showing the positioning of the convolutions of a spring produced according to the method shown in Figures 1, 2 and 3, with respect to a reference plane (referred to hereinafter).

It has been found that by taking a length of spring wire and giving it, at predetermined points throughout each unit length thereof, definite angular sets to form convolutions, and to give opposite sides of the respective convolutions thus formed different effective or net heights with respect to a plane which is perpendicular to the plane of the convolutions and which forms with the axis of the spring an angle equal to the complement of the angle of skew and repeating the sets at cyclically recurrent points throughout the succeeding lengths of the wire, that a skewed convoluted spring results. Such a spring has the individual convolutions thereof inclined at an angle of skew to the spring axis and with each convolution having a shape determined by the angular sets throughout each unit length. While it has been chosen to illustrate in the drawing means for winding a skewed spring of triangular shape, it will be understood that a spring of any other shape such as D-shape, square, etc. may be similarly produced.

The term "effective net height" above referred to, means the perpendicular height, with respect to the plane, to which the opposite sides extend above or below the plane.

Referring particularly to Figs. 6, 7 and 8 of the drawings, there is schematically represented the fundamental method of forming a spring according to the invention. A length 1 of spring wire has one end secured, as to a post 2, and is adapted to be wound around the fixed pins 3, 4 and 5. In order that the spring convolutions when removed from the pins may remain parallel to one another, it has been found expedient to give the wire accurately predetermined angular sets around each pin. This angular set, of course, will be determined by the diameter of the wire and its natural resiliency. Assuming for the purpose of description that a convoluted equiangular triangular shaped skewed spring is to be wound, such as shown in Figs. 3, 4 and 5, it is expedient that the said angular sets should be such that the wire naturally assumes an angle of sixty degrees between the adjacent legs of the triangle. For this purpose the pins 4 and 5 may be positioned at respective corners of an equilateral triangle and pin 3 may be positioned on a side of the equilateral triangle adjacent pin 4.

As shown in Fig. 6, the wire 1 is carried around pin 4 until it forms an "overbend" angle "a" with itself around said pin. This overbend angle "a" is determined by experiment with the particular size and temper of wire to be used, and with the particular tension and diameter of pins used, and is the angle necessary under these conditions to give a natural set of 60° to the wire. The wire is then carried back to the position shown by the dotted line (Fig. 6) to clear the pin 5.

As shown in Fig. 7 this same length of wire is then carried around pin 5 until it again forms the angle "a" with the preceding side 6 whereby it is given a natural set of 60°. The wire is carried back in order to clear pin 3 until it assumes the position shown in dotted lines (Fig. 7) and is then carried around pin 3, as shown in Fig. 8, to give it the proper and natural set of 60° around said pin. It is thus seen that in this example the angles between adjacent sides of the convolution formed by bending the wire about the pins 3, 4 and 5, are each 60°, and that as successive convolutions are made they will also have 60° angles. The side 3—4 of each convolution, however, is shorter than the side 5—4, and the side 3—5 is also shorter than the side 5—4 but longer than the side 3—4. Thus there is a tendency for the angles between the sides 3—5 and 3—4 to assume an angle greater than 60°. But as each convolution leaves the pins, the angle between the sides 3—5 and 3—4 assumes its 60° set thus forming an equiangular triangle having unequal sides. In this way the skew is given to the spring, for the effective perpendicular height of the side 4—5, with respect to a reference plane which is perpendicular to the convolutions and which forms an angle with the spring axis equal to the complement of the angle of skew, is greater than the height of side 3—4 with respect to the same plane, and each succeeding convolution is placed below the prior one an amount equal to the said difference in height or the distance $d$ (Fig. 5). This process is repeated throughout the succeeding lengths of the wire, resulting in a convoluted spring which, as shown in Figs. 3 and 4 has its adjacent turns touching and offset a distance "S". When the spring shown in Figs. 3 and 4 is stretched the turns separate and assume the spacing and inclination shown in Fig. 5.

A mathematical predetermination of the inclination or skewness to the common axis of the convolutions of the finished spring may be performed as follows: According to the intended use, the angle of skew, which the convolutions 7 and 8 (see Fig. 5) are to make with the common axis 9, when the desired spacing $d$ is made, is first determined. From this the dimension of the "slip" S (Fig. 4) may be determined, the "slip" S being the distance which one convolution is spaced below the preceding convolution.

If the equiangular triangular spring, as shown in Fig. 3 is wound, the righthand side of each convolution as viewed in Fig. 3, is longer than the lefthand side, by the chosen dimensions of the "slip" S multiplied by the secant of the angle formed by the short side and said reference plane. In the example shown, the angle thus formed is one-half the angle between the two sides, or thirty degrees. In Figs. 3, 4 and 5, if the spacing $d$ between the convolutions is assumed to be one-eighth of an inch, and the inclination of the convolutions to the axis 9 to be approximately 45°, the dimension S is approximately 0.088 inches. The secant of 30° is 1.154, and the dimension S multiplied by 1.154 is 0.105 inches, which is the difference between the dimensions of sides 5—4 and 3—4. It is to be noted that the greater the difference between the right and lefthand sides of each convolution the greater the "slip", dimension S, and the greater the skew of the finished spring.

From the above calculations an equiangular triangular skew convoluted spring having a spacing $d$ between the convolutions equal to one-enghth of an inch, and having the individual convolutions inclined at an angle of 45° to the spring axis, may be formed with pin 3 separated from pin 4 approximately 0.648 inches, a separation of approximately 0.750 inches between pins 4 and 5, while pins 5 and 3 are approximately 0.699 inches apart.

The sketch of Fig. 15 shows the position of the reference plane above mentioned. In the sketch the convolutions of the spring are represented by the horizontal lines C. The spring axis is represented by the line A which passes through the convolutions C.

The angle of skew, L, is shown as the angle made by the convolutions C and the spring axis.

The reference plane, described as perpendicular to the plane of the convolutions and as forming an angle with the spring axis which is equal to the complement of the angle of skew, is represented in the sketch by line R and is shown forming with the axis A an angle B which is the complement of angle L, the angle of skew.

Should the pins be spaced equally a triangular spring would be produced but the individual turns thereof would not be displaced, as shown in Fig. 4, and when such a spring is stretched the convolutions would be substantially normal to the spring axis, and if a pressure is applied to such a non-skewed spring in a direction perpendicular to the spring axis it would in all probability result in a permanent deformation of the spring convolutions. On the other hand, with a skewed spring such as in Fig. 5 resulting from the stretching of the "slipped" spring of Figs. 3 and 4 the adjacent convolutions are in partial overlapping relation, and pressure normal to the spring axis 9 simply increases the tilt of the convolutions, which due to their resiliency, spring back to their normal skewed position without any deformation. It has been found that the inclination of the spring turns may be varied by changing the distance between pins 3—4 and 3—5 of Figs. 6, 7 and 8.

Referring particularly to Figs. 1 and 2, a description will now be given of a machine which automatically carries out the fundamental method disclosed in Figs. 6, 7 and 8. In Figs. 1 and 2 the numeral 10 represents a spool or reel carrying a supply of spring wire to be formed into a skewed spring, said spool being adapted to be revolved in the direction of the arrow around a fixed frame 32. The spool 10 is rotatably mounted on a spindle 11 carried by the arm 12. The spool 10 is provided with any suitable form of "friction drag". This preferably comprises a frame 13 which is adapted to swing around the spindle 11. Mounted for endwise movement in the arms 14 and 15 of the frame is a friction member 16 which is held in engagement with the spool rims under force of spring 17. The frame 13 is normally held in the position shown in Fig. 1 under tension of spring 18 which has one end fastened to the frame, and the other to a projection 19 on the arm 12. As tension on the wire 20 increases, frame 13 tends to rotate counterclockwise, but is opposed by the tension of spring 18. A similar arrangement for taking up slack is employed comprising a relatively large capstan pulley 24 around which the wire 20 is given one or two turns. A friction member 16' is pressed by spring 17' against the circumferential face of pulley 24 and a spring 18' tends to oppose the counter-clockwise rotation of pulley 24 and in effect maintains a substantially uniform tension in the wire 20 taking up any momentary slack that may occur during the winding process. Arm 12 carrying the spool and wire supply is keyed to the hub-like extension of a cam-frame 21 which is journalled on standard 22. Both arm 12 and frame 21 are adapted to be rotated on standard 22 in the direction of the arrows through the intermediary of suitable gearing represented by numeral 23 which is also keyed to the hub of frame 21. Arm 12 has formed integral therewith an extension 26 in which is fastened a spindle 27. Spindle 27 has its upper end reduced to provide a bearing for an oscillating bell-crank member comprising the arms 28 and 29. Arm 28 at its free end carries a pair of rollers or fingers 30 between which passes the wire 20. The free end of arm 29 acts as a cam follower and is provided with a roller 31. The bell crank is adapted to be oscillated around the spindle 27 at the proper times under control of the stationary cam frame 32.

As shown clearly in Fig. 1, the frame 32 has its edge cut out to form a three lobe cam. As the arm 12 rotates, the member 29 of the bell crank is held in engagement with the cam edge of said frame by means of a spring 33 which has one end fastened to the arm 28 and the other end attached to an extension 34 provided on the arm 12. It is obvious therefore that as the roller 31 rides on the cam portion 35, for example, there is no relative movement between the bell-crank and the traveling arm 12. When the follower 31 drops off face 35 the bell-crank is rapidly rotated in a clockwise direction causing the wire between the rollers 30 to be rapidly "flipped" backward relative to the arm 12. It will be understood that the moving forward of the arm 12 and spool 10 is concurrent with the backward "flip" of the bell-crank, and the cam face 36 is preferably so designed that this backward "flipping" movement of the wire is effected at a greater relative speed than the forward travel of spool 10.

When the wire has been "flipped" back to the required point a pin 37, which was previously depressed, now rises and acts as a fixed winding pin around which the wire 20 is given a predetermined "overbend" due to the continuous motion of the arm 12 and spool 10. As the wire is being thus bent around pin 37 the follower 31 rides upon the cam face 38ª and the bell-crank is gradually moved forward in the same direction as the moving spool. Face 38ª may be so designed that this forward movement may take up any momentary slack that may have been formed due to the preceding "backward" flip as hereinabove described.

The frame 32 is provided at its central portion with three slots 40, 41 and 42 which act as guides for the spring winding pins 37, 38 and 39, respectively. Each of these pins is provided with an extension 43 which is pivoted as at 44 in a small bracket 45 attached to the lower face of the fixed frame 32. The tips of the pins tend to assume a depressed position under control of suitable springs 46. For example, the pin 37 is shown in Fig. 2 in its depressed position. For the purpose of raising the pins at the proper times, the frame 21 which rotates together with the arm 12, carries the cam-track 47 which cooperates with the rollers 48 carried on the ends of the pin extensions 43. The cam 47 is so designed and disposed with relation to the frame 32 that each pin is first depressed and then the arm 28 is "flipped" forward to carry the wire in advance of the depressed pin whereupon the arm 28 is again "flipped" backwards under control of the spring 33 and the corresponding pin is again raised.

Assuming the device shown in Figs. 1 and 2 to be in its starting position, the operation of winding a spring is as follows:

The wire 20 is given a few turns around the capstan 24 and passes thence between the fingers 30 and around pins 38 and 39. The free end of the wire may be temporarily fastened for the purpose of preventing the unwinding of the spring during the formation of the first few turns, by giving it a few twists around the pin 38. With the apparatus in the position shown in Figs. 1 and 2, the extension 43 of the pin 37 is in engagement with the cut-out portion of the cam 47 and consequently the tip of pin 37 is held in its depressed position under tension of a spring similar to spring 46. As the arm 12 rotates and carries with it the wire 20, the said wire is bent around the pin 39 and clears the depressed pin 37. Consequently, the wire is given an increasing angular set or "overbend" around pin 39. When the requisite overbend is given, as determined by the length of the cam face 35, the follower 31 rides off said cam face and the bell-crank 28, 29 is rapidly flipped in a clockwise direction by spring 33, causing the follower 31 to engage the cam face 38ª. The cam 36 is so designed that this "flipping" back of the wire carries it to a point just in back of the pin 37. However, due to the springiness of the wire this backward movement is of no effect to change the set of the wire about pin 39. A short instant later the raised portion of cam 47 engages pin 37 and raises the latter. The wire 41 it will be understood is meanwhile traveling at a constant velocity around the frame 32 and accordingly, when pin 37 is raised, the said wire is carried around said pin to give it the required overbend, as already described in connection with the pin 39.

The foregong process is repeated for each of the pins, the sequence of operations being such that when the wire 20 is about to approach a pin, the said pin is depressed under control of cam 47 and the wire continues its forward travel to give it the required overbend about the preceding pins, whereupon the wire is suddenly flipped backward and the previously depressed pin is raised and the wire carried around the same. In this connection it may be noted that the wire is carried around the pins close to the surface of member 32, thus allowing only one or two turns of spring to remain on the pins, these turns being gradually forced off by succeeding turns. It will be understood that any suitable guide plate may be provided above the pins for guiding off the spring turns as they are forced off the winding pins.

Referring to Figs. 9, 10, 11, 12 and 13, there is shown a machine which is in general similar to the machine disclosed in Figs. 1 and 2 with the exception, however, that an additional set of movable pins is provided for more positively effecting the set of the wire in the winding process. Parts corresponding to those of Figs. 1 and 2 are represented by the same designation numerals. In addition to the winding pins 38, 39 and 40, there are provided three vertically movable "back breaking" pins 49, 50 and 51 which are normally held in a depressed position by means of springs 52. For the purpose of positively raising each of the latter pins at the proper instant the rotating frame 21 is provided with a cam track 53 which cooperates with corresponding pivoted levers 54 adapted to raise the "back breaking" pins against the tension of springs 52. These pins 49, 50 and 51 are provided to insure that the wire extending from one winding pin to another is substantially straight. The actual winding pins 38, 39 and 40 are adapted to be raised and lowered in a manner similar to that described in connection with Figs. 1 and 2, with this difference, however, that the action of said pins in the modification of Figs. 9 to 13 is positively controlled by a shrouded cam 55, thus avoiding the use of the springs 46 of Fig. 1.

The machine is shown in Figs. 9 to 13 inclusive just after a partial turn has been completed around pins 38 and 39. The arm 12 together with the wire supply is shown in Fig. 9 just as the wire 20 (full line position) has been given the requisite "overbend" around pin 39. In this position of the apparatus the tips of pins 38 and 39 are in their raised positions under control of the cam 55. Similarly the back-breaking pin 50 has just been raised by the extension 54 engaging the raised portion 56 (Figs. 8 and 9) of cam 53. At this instant the follower 31 is just ready to ride-off the cam face 35 whereby the wire 20 is "flipped" backward rapidly, as hereinabove described. During this backward flip, pins 40 and 51 are in their depressed positions under control of cams 55 and 53 respectively, as shown clearly in Figs. 10 and 11, while pin 50 is maintained in its uppermost position by cam portion 53. When the follower 31 engages the cam face 38ª the wire has been flipped backwardly to the required extent against the raised pin 50 and immediately thereafter pin 40 is raised by cam 55.

A typical operation of the machine shown in Figs. 8 to 13 is as follows:

With the parts of the machine in the position shown, the pins are depressed. It will also be assumed that the wire 20 with the free end suitably looped around pin 38 has been carried around the raised pin 39. As the arm 12 revolves and carries with it wire 20 together with the bell-crank 28, 29 in a clockwise direction, the follower 31 rides on the cam portion 35, as hereinabove described. When the wire has been thus carried around pin 32 the proper distance to give it the required overbend, as represented by the full-line position of wire 20, follower 31 drops off the cam 35 and under the tension of a spring similar to spring 33 of Fig. 1, the bell-crank is rotated in a clockwise direction until the follower 31 engages the cam face 38ª. During the interval that the wire 41 was being carried around pin 32 to give it the required overbend, the previously depressed pin 50 was raised by the cam portion 56. Consequently, on the backward flip of the wire 20, pin 50 being thus raised, the wire comes into engagement with said pin and prevents the wire being bowed outwardly. In this connection it will be understood that the pins 49, 50 and 51 are so positioned with this "back breaking" effect in conjunction with the set of the wires around the pins causes the length of wire between pins to be straightened. In the interval between the engagement of the wire 20 with the pin 50 and when said wire has been flipped back by the bell-crank sufficiently to clear pin 40, this latter pin is raised by the cam 55. The wire supply continues to revolve and causes the wire 20 to be carried around the pin 40 which is now in its raised position. Immediately thereafter pin 38 is depressed and the wire is carried around pin 40 and passes over pins 51 and 38 sufficiently to give it the required overbend around pin 40, as hereinbefore described. When the overbend has been given the back-breaking pin 51 is raised and immediately thereafter wire 20 is flipped backwardly by the bell-crank to straighten out the wire between pins 40 and 38. The foregoing sequence of operations is repeated for each of the succeeding sets of pins. In this connection it will be noted that the winding pins protrude just sufficiently above the surface of the pin block 23 to enable a few turns of wire to be maintained on said pins after winding, so that succeeding turns will force the preceding turns off the top of the pins through any suitable guiding plate mounted above the pin block.

While the foregoing description has been given in connection with the formation of a triangular shaped spring it will be obvious that a spring of any other shape may be wound in a similar manner by using the proper number of pins which are unequally spaced. If a rectangular skewed spring is wound, the "slip" S is the difference in length between the right and left-hand sides of the convolution. The pins as shown in Figure 14 are set to enable the winding of a skewed rectangular spring of this class, the "slip" of which would be the difference between the dimensions $a$ and $b$.

The finished spring such as shown in Figs. 3, 4 and 5, while it may be used for a variety of purposes, is particularly well adapted to provide a resilient surface for laundry pressing or ironing machines since the adjacent convolutions overlap each other at an angle and therefore the spring is capable of substantial localized compression without danger of permanent deformation of the spring convolutions. Furthermore, the spring may be mounted on the press supporting base so that the flat sides are adjacent and present a substantial, continuous and uniform surface suitable for supporting the pressing fabric. In this connection it may be noted that the resiliency of such a surface may be determined by the normal degree of slant of the spring convolutions.

While in the foregoing description the pin carrier is stationary and the wire moving, it is obvious that similar results may be accomplished by having the wire stationary and the pin block rotating. Other changes may be made in the apparatus disclosed without departing from the spirit and scope of the invention. Accordingly, while the method illustrated in Figs. 6, 7 and 8 accomplishes the "overbending" by carrying the wire around winding pins, it will be understood that the drawing is in this connection merely schematic. Therefore, instead of winding the wire 1 around fixed winding pins the wire may be fed forwardly in a straight line and given the required "overbend" at the predetermined points by special bending tools such as dies or the like.

What is claimed is:

1. As a new article of manufacture, a spring having multi-sided convolutions skewed at an angle to the spring axis, the sides of adjacent convolutions providing a substantially uniform and continuous even supporting surface.

2. As a new article of manufacture, a triangular convoluted spring wherein each elemental section comprises a single loop, each elemental section being spaced from the succeeding one so that the spring will be resilient in a direction normal to the spring axis and capable of substantial localized compression in a direction perpendicular to the axis of the spring without danger of permanent deformation to the spring convolutions.

3. As an article of manufacture, a spring, having a number of convolutions, the opposite sides of some of said convolutions having different net heights with respect to a reference plane which is perpendicular to the plane of the convolutions, and which forms an angle with an axis of said springs which is equal to the complement of the angle of skew.

4. As an article of manufacture, a spring, having a number of convolutions, the opposite sides of some of said convolutions having different net heights with respect to a reference plane which is perpendicular to the plane of the convolutions, and which forms an angle with an axis of said springs which is equal to the complement of the angle skew, all the sides of said convolutions having the same physical characteristics.

5. As an article of manufacture, a spring, having a number of convolutions, the opposite sides of some of said convolutions having different net heights with respect to a reference plane which is perpendicular to the plane of the convolutions, and which forms an angle with an axis of said springs which is equal to the complement of the angle of skew, and the said opposite sides having different net heights being undistorted.

In testimony whereof, ARTHUR H. ADAMS has signed his name to this specification this 9th day of June 1928.

ARTHUR H. ADAMS.